US005661300A

United States Patent [19]

Hansen et al.

[11] Patent Number: 5,661,300

[45] Date of Patent: Aug. 26, 1997

[54] CHARGED PARTICLE MIRROR

[75] Inventors: Stuart C. Hansen, Palo Alto; Carl A. Myerholtz, Cupertino, both of Calif.

[73] Assignee: Hewlett-Packard, Palo Alto, Calif.

[21] Appl. No.: 714,833

[22] Filed: Sep. 17, 1996

Related U.S. Application Data

[63] Continuation of Ser. No. 434,332, May 2, 1995, abandoned, which is a continuation of Ser. No. 315,797, Sep. 30, 1994, abandoned.

[51] Int. Cl.[6] .......... B01D 59/44; H01J 49/00

[52] U.S. Cl. .......... 250/287; 250/282; 250/396 R

[58] Field of Search .......... 250/286, 287, 250/396 R, 281, 282

[56] References Cited

U.S. PATENT DOCUMENTS

| | | | |
|---|---|---|---|
| 2,143,390 | 1/1939 | Schroter . | |
| 3,621,242 | 11/1971 | Ferguson et al. . | |
| 4,091,144 | 5/1978 | Dresner et al. | 428/328 |
| 4,238,678 | 12/1980 | Castleman et al. | 250/287 |
| 4,370,594 | 1/1983 | Kuzentzoff | 313/458 |
| 4,390,784 | 6/1983 | Browning et al. | 250/287 |
| 4,625,112 | 11/1986 | Yoshida | 250/286 |
| 4,704,532 | 11/1987 | Hua | 250/292 |
| 5,077,472 | 12/1991 | Davis | 250/287 |
| 5,162,649 | 11/1992 | Burke | 250/287 |
| 5,235,182 | 8/1993 | Avida et al. | 250/287 |
| 5,464,985 | 11/1995 | Cornish et al. | 250/287 |

FOREIGN PATENT DOCUMENTS

| | | | |
|---|---|---|---|
| 0357145 | 3/1990 | European Pat. Off. . | |
| 0551999 | 7/1993 | European Pat. Off. . | |
| 0004433 | 1/1991 | Japan | 250/286 |

OTHER PUBLICATIONS

Wang, et al., Design Parameters of Dual–Stage–Ion Reflectrons, Review of Scientific Instruments 65, No. 5, May 1994, pp. 1585–1589.

European Search Report dated Nov. 28, 1995, European Patent Appln. No. 95108143.9 filed May 26, 1995.

Chien et al., Int'l. Journal of Mass Spectrometry & Ion Processes, 131(1994): 149–179, 1994.

Cotter, R.J., Analytical Chemistry, 64(21):1027A–1039A, (Nov. 1992).

Grix et al., Rapid Communications in Mass Spectrometry, 2(5):83–85, (1988).

Karataev et al., Soviet Physics–Technical Physics, 16(7):1177–1179, (Jan. 1972).

Kutscher et al., Int'l. Journal of Mass Spectrometry & Ion Processes, 103(1991):117–128, (1991).

Mamyrin, B.A., Int'l. Journal of Mass Spectrometry & Ion Processes, 131(1994):1–17, (1994).

Mamyrin et al., Sov. Phys.–JETP, 37(1):45–48, (Jul. 1973).

Wei et al., Int'l. Journal of Mass Spectrometry & Ion Processes, 131(1994):233–262, (1994).

Wiley et al., Rev. of Scientific Instruments, 26(12):1150–1157, (Dec. 1955).

*Primary Examiner*—Bruce Anderson

[57] ABSTRACT

A controlled gradient device acts as a reflectron that controls the velocity and direction of a charged particle stream when an external voltage source is applied. An enclosing insulating structure has a metallized contact ring on each end. The interior surface has a resistive coating to provide a continuous electrically resistive surface that generates a desired voltage gradient along the length when a voltage is applied across the metallized contact rings. Each of the metallized contact rings can be a metal mesh that is coincident with a cross-sectional region of the conduit so that the electrical potential is constant at these locations.

20 Claims, 6 Drawing Sheets

CHARGED PARTICLE MIRROR

CROSS REFERENCE TO RETAILED APPLICATION(S)

This is a continuation of application Ser. No. 08/434,332 filed on May 2, 1995, now abandoned; which is a continuation of application Ser. No. 08/315,797 filed Sep. 30, 1994, now abandoned.

BACKGROUND OF THE INVENTION

1. Field of the Invention

This invention relates to charged particle mirrors and, more specifically, to an ion mirror used in time-of-flight mass spectroscopy. The invention provides a continuous voltage gradient that allows more precise and efficient sample analysis.

2. Description of the Related Art

In time-of-flight-spectroscopy, ions are formed in a short source region in the presence of an electric field that accelerates the ions into a longer, field-free drift region. Ideally, the electric field imparts the same kinetic energy (KE) to the ions equally so that they will have different velocities, which depend on their mass. The time (t) required for the ions to traverse the drift region depends on the mass of the ion. The time axis in a time-of-flight mass spectrometer reflects not only the mass but the initial energy distributions of the ions (temporally, spatially, and kinetically), their fate during acceleration, and properties of the recording system. Due to a distribution of internal energies, two ions of the same mass can be accelerated from the same location but have different velocities (kinetic energies). When this occurs, a distribution in arrival times at the detector is recorded causing a loss of resolution. A further loss of resolution is caused by ions accelerated from different locations.

The resolution may be improved by applying high accelerating voltages, thus minimizing the contribution from different ion energies or by using an ion mirror, a "reflectron", as suggested by Mamyrin et al. in 1973, to correct for the temporal effects of initial kinetic energy distributions. The reflectron, located at the end of the flight tube, consists of a series of rings and/or grids with voltages that increase (linearly in the simplest case) up to a value slightly greater than the voltage at the ion source. The ions penetrate the reflectron until they reach zero kinetic energy, turn around, and are reaccelerated back through the reflectron, exiting with energies identical to their incoming energy but with velocities in the opposite direction. Ions with more energy penetrate the reflection deeper and will have longer flight paths than those with less energy. These higher energy ions can be made to arrive at the detector at very nearly the same time as less energetic ions, thereby compensating for the energy spread. Unfortunately, the ions experience a piecewise-linear electric field gradient due to the discrete nature of voltages on each ring. Ions near the inner perimeter can be lost and external electric fields can affect the remaining ions. Furthermore, this "series of rings" is bulky and costly to manufacture. The rings present a large surface area to the vacuum system, which requires additional pumping capacity to handle the potentially large initial water vapor and desorbed gas load.

What is needed is a controlled gradient device that is capable of generating a continuous electric field gradient to maximize useful signal from the ion sample. It would be further beneficial if the controlled gradient device were self-shielding to minimize the effect of any external electric fields on the ion sample.

SUMMARY OF THE INVENTION

A controlled gradient device acts as a charged particle mirror, which controls the velocity and direction of the path of a charged particle stream when an electric field is applied. The controlled gradient device is an insulating substrate that may have material on its exterior wall to minimize the effects of spurious external electric fields. Each end of the substrate has a metallized contact. The interior wall has a resistive coating to provide a continuous resistive surface that generates a desired voltage gradient when a voltage is applied across the metal contacts. Each of the metallized contacts may be a mesh coincident with a cross-sectional area of the substrate so that the applied electric field is terminated. Additional intermediate contacts and meshes may be used to modify the voltage gradient.

The controlled gradient device generates a continuous voltage gradient between contacts and meshes and allows for precise and efficient use of the ion sample. Furthermore, the device is economical to manufacture, self-shielding, and compact.

DETAILED DESCRIPTION

This invention is an electrically resistive controlled gradient device for use in scientific instruments and systems, particularly, time-of-flight mass spectrometers. In one application, the device behaves as an ion mirror (reflectron) which corrects differences in ion arrival times at a detector by controlling the path length of a charged particle stream when a continuous voltage gradient is applied. Other applications are described below.

Figure 1:
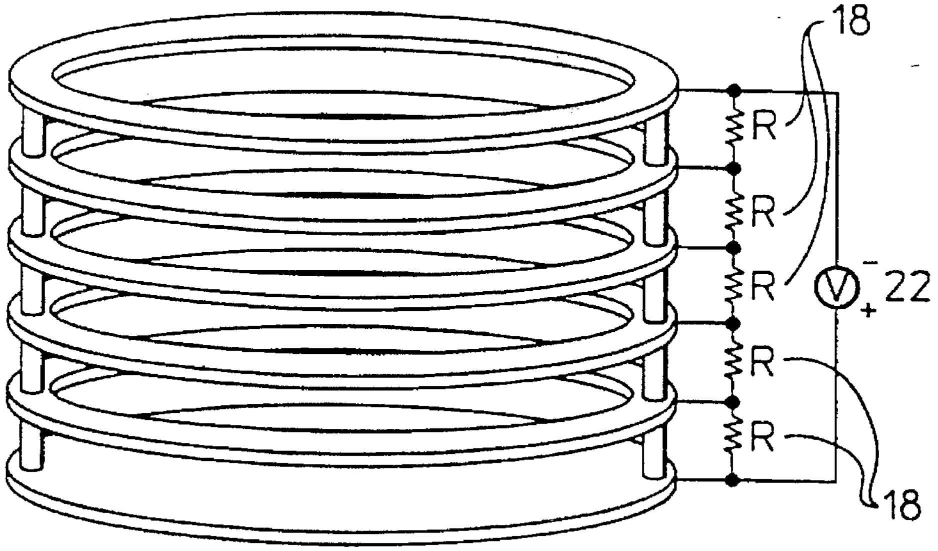
FIG. 1 (PRIOR ART)
FIG. 1 is a "series of rings" reflectron of the prior art.

FIG. 1 is a "series of rings" reflectron of the prior art that establishes a voltage gradient along the rings by means of discrete resistors 18 and a voltage source 22.

Figure 2:
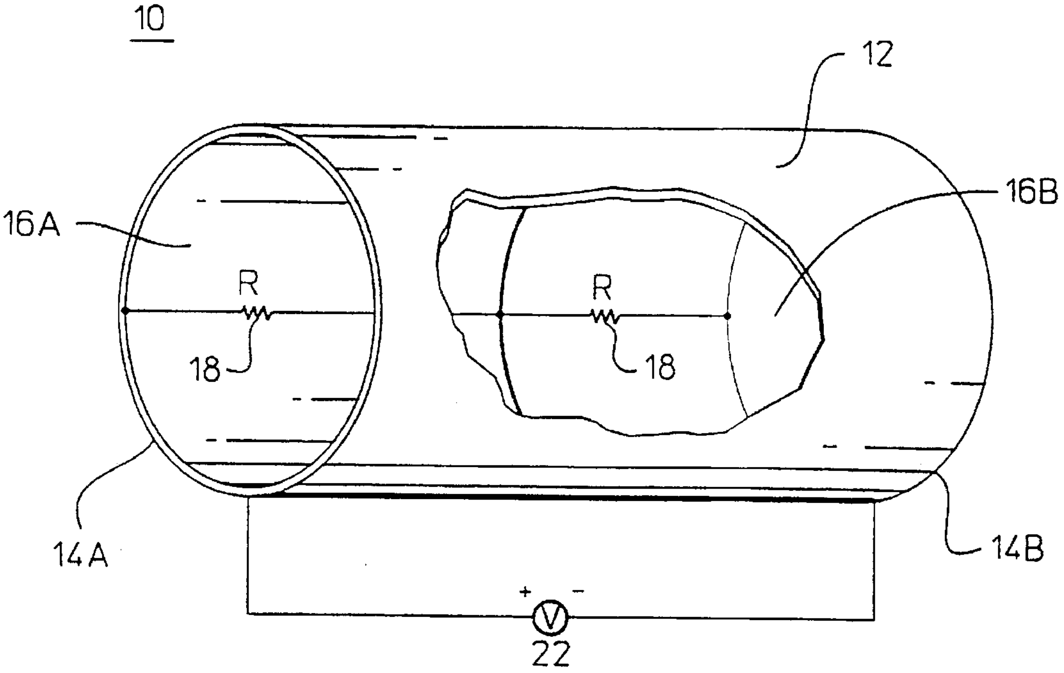
FIG. 2 is a controlled gradient device having a rounded interior surface and voltage tap.

FIG. 2 shows a preferred embodiment of a controlled gradient device 10, which controls the path of a charged particle stream when a voltage is applied across its length. The controlled gradient device 10 contains an enclosing structure 12 (substrate) of insulating material. There are metallized contact rings 14A, 14B, each positioned at opposing ends of the structure. Each contact 14A, 14B is distributed around a corresponding cross-sectional region 16A, 16B of the enclosing structure 12. Each of the contacts 14A, 14B may include a fine metal mesh to provide a constant electrical potential at the respective cross-sectional region 16A, 16B. Alternatively, one of the contacts may also be a solid backplate. The rounded interior surface of the structure 12 is coated with a resistive film 18, which provides a continuous electrically resistive interior surface that will have a desired voltage gradient established when a voltage is applied to the two contacts 14A, 14B. In the embodiment illustrated in FIG. 2, an optional contact ring 32, or rings, has been added along the interior surface between the two metallized contact rings 14A, 14B. The optional contact rings make is possible to establish different gradients between adjacent contacts, if desired. This, in turn, improves the ability to create a different gradient profile, for example, piecewise linear. Each optional contact ring 32 may include a fine metal mesh to provide a constant electrical potential at the associated cross-sectional region.

The enclosing structure 12 is made of an insulating material such as glass, quartz, ceramic or plastic (such as polyamide) to which the contacts can be attached. The cylindrical shape of the enclosing structure is desirable because it is easy and economical to manufacture while allowing a controllable voltage gradient to be established. The metallized contacts 14A, 14B are made of a conductive material such as deposited metal that is compatible with the resistive film. The resistive film 18 may be cermet thick-film, metal oxide film, polysilicon film, or any coating which has a finite and uniform sheet resistance R when a voltage is applied and can be attached to an insulator. A resistive "bulk" material could substitute for the resistive film 18 and insulating structure 12.

Figure 3:
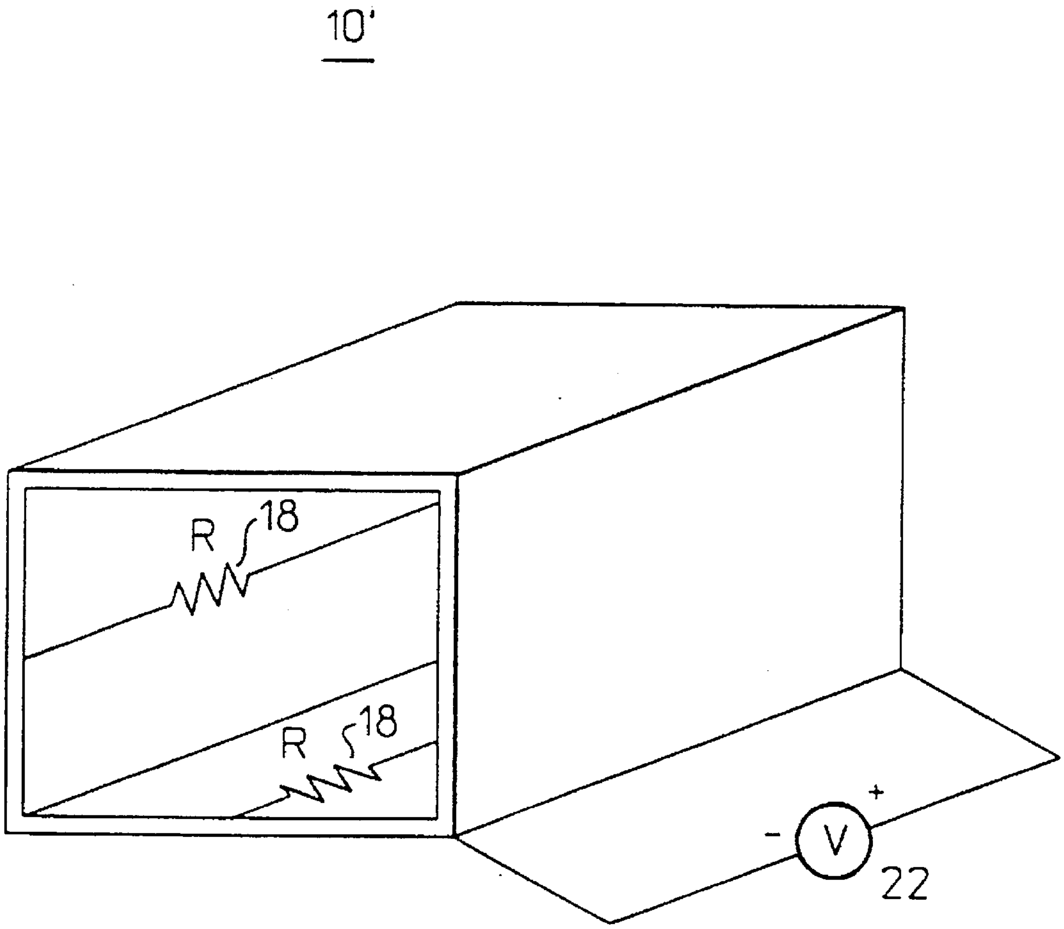
FIG. 3 is a controlled gradient device having an angular interior surface.

FIG. 3 is an illustration of a controlled gradient device 10' composed of a series of interconnected flat resistive plates. The voltage drop along the interior surface approximates the gradient established by the controlled gradient device 10. The embodiment illustrated in FIG. 3 has a cross-section that is approximately square. Other polygonal cross-sections may also be used by joining the appropriate number of resistive plates.

Figure 4:
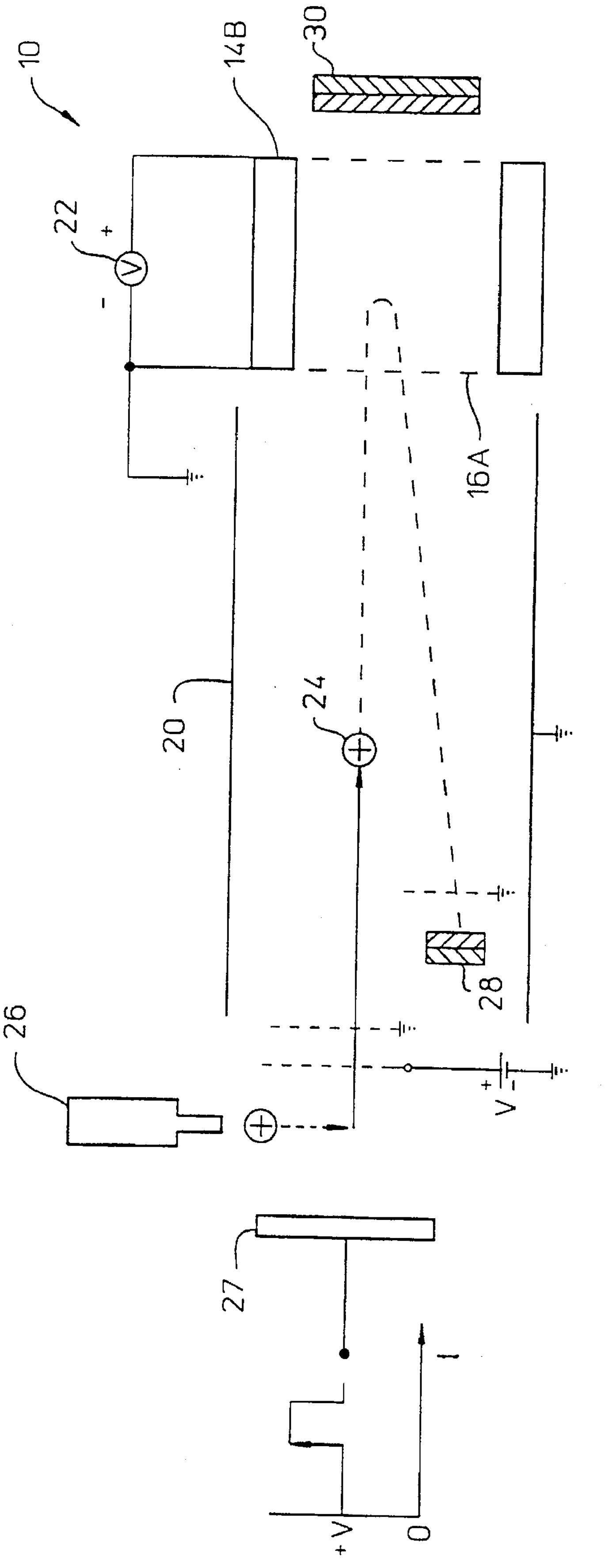
FIG. 4 is an illustration of the controlled gradient device when used as a reflectron.

FIG. 4 is an illustration of the controlled gradient device 10 when used as a reflectron. The controlled gradient device 10 is positioned at one end of a flight tube 20. A voltage source 22 is applied across the metallized contacts 14A, 14B. Ions 24, from an ion source 26, when accelerated towards the reflectron when a voltage pulse is applied to a repeller plate 27, penetrate a first cross-sectional region 16A, which is coincident with one of the metallized contacts 14A, decelerate until they reach zero kinetic energy, turn around, and are reaccelerated back through the controlled gradient device 10, exiting with energies and speed identical to their incoming energy and speed. The angle of incidence of each ion entering the reflectron is approximately equal to the angle of reflection. Ions with larger energies penetrate the controlled gradient device more deeply and will have longer flight paths, arriving at an ion detector 28 at very nearly the same time as less energetic ions. This minimizes the arrival spread of the ions due to kinetic energy differences. A neutral detector 30 can be used to record a spectrum of neutral species because they are unaffected by electric fields and pass through device and reach the detector unreflected.

Figure 5:
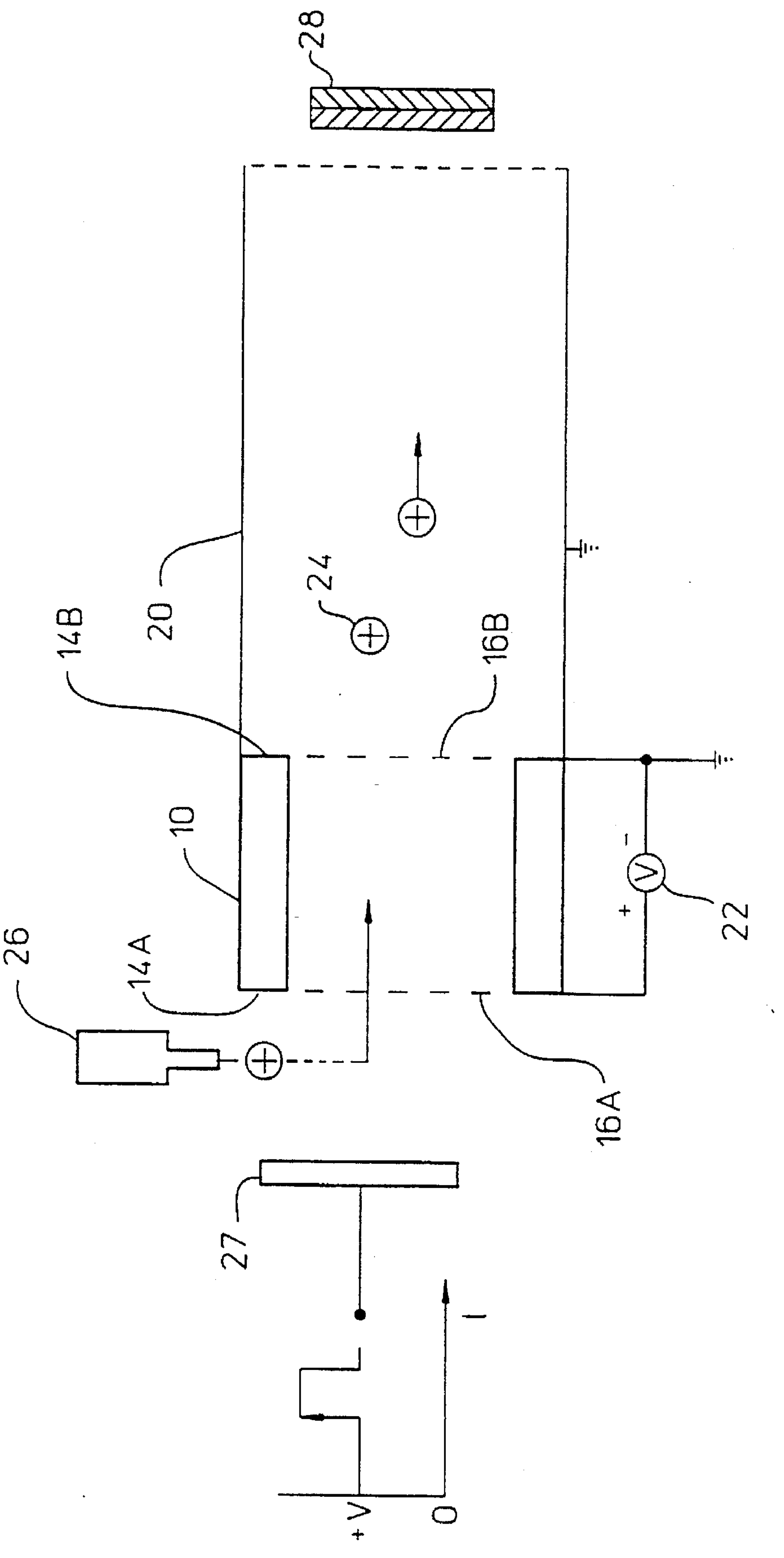
FIG. 5 is an illustration of the controlled gradient device when used as a accelerator or pulser.

FIG. 5 is an illustration of the controlled gradient device 10 when used as an accelerator or pulser. At one end of a flight tube 20, the controlled gradient device 10 is positioned in front of an ion source 26. When a voltage source 22 is applied across the contacts 14A, 14B and a positive voltage pulse is applied to the "repeller plate" 27, the ions 24 pass through the first and second cross-sectional regions 16A, 16B and are "pulsed" or "accelerated" into a drift region, which is defined as the region within the flight tube 20. This pulse provides a timestamp from which the drift time of the ions to a conventional detector 28 can be measured.

Figure 6:
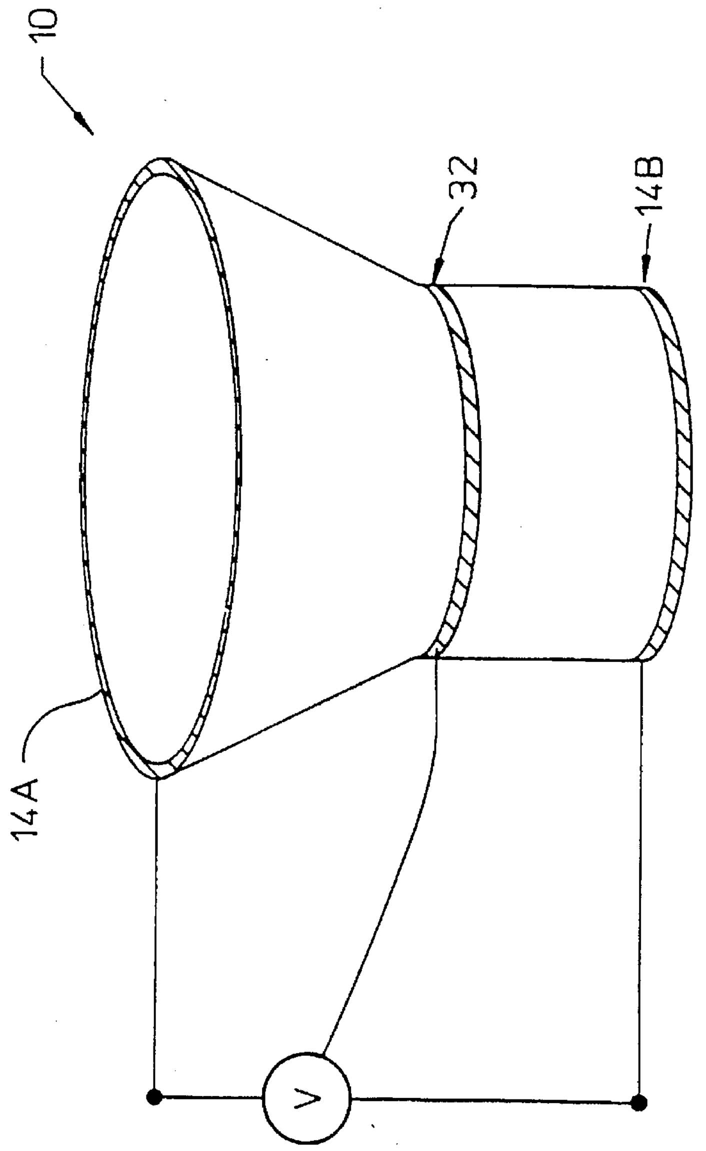
FIG. 6 is the controlled gradient device shaped as a funnel.

FIG. 6 illustrates a controlled gradient device 10 shaped as a funnel. The funnel, having straight or curved sides, provides a variable electric field gradient rate which is sometimes needed in charged particle optical applications. The optional tap contact ring 32 may be positioned between the two contacts 14A, 14B for tailoring the mirror voltage gradient for multiple uses. The voltage V can be modulated and/or switched between set values to alter the ion stream or to provide selectivity to the mirror function, for example so it will operate as an accelerator or a reflectron.

We claim:

1. A reflectron for reflecting charged particles with the same polarity, the charged particles having one or more levels of kinetic energy and traveling from a source on a path, the reflectron comprising:

an encircling structure including a continuous resistive film which has a resistive internal surface encircling a portion of the path of the charged particles and has a sheet resistance, the encircling structure having a first cross-sectional region through which the charged particles from the source enter the encircling structure and having a second cross-sectional region more distal to the source than the first;

a first metallized contact, connected to the encircling structure at the first cross-sectional region;

a second metallized contact, connected to the encircling structure at the second cross-sectional region; and voltage supply for connecting electrically to the first metallized contact to apply thereto a first voltage and connecting to the second metallized contact to apply thereto a second voltage which is more repulsive to the charged particles than the first voltage to result in a continuous electric field gradient along the resistive film between the first cross-sectional region and the second cross-sectional region to continuously repel the charged particles to exit the encircling structure at the first cross-sectional region and such that the charged particles entering the encircling structure at their respective entering speed will penetrate the encircling structure to different distances dependent on their kinetic energy level before turning around and will exit the encircling structure with speed equal to their entering speed.

2. The reflectron according to claim 1, wherein the resistive film has a shape such that a cross-section thereof at any location between the first and the second metallized contacts has a symmetrical perimeter.

3. The reflectron according to claim 1, wherein the encircling structure generates the electric field gradient and apply continuous repulsive force on the charged particles in an encircling manner.

4. The reflectron according to claim 1, wherein the encircling structure includes an insulating encircling structure having an internal surface on which the resistive film is coated.

5. The reflectron according to claim 1, wherein the first metallized contact is a metal ring with a metal mesh.

6. The reflectron according to claim 1, wherein the encircling structure, the voltage supply; and the metallized contacts are adapted such that the charged particles entering the encircling structure at the first cross-sectional region at the same time will exit the encircling structure at the first cross-sectional region at the same time after being reflected.

7. The reflectron according to claim 1, wherein the encircling structure has a third cross-sectional region positioned between the first and second cross-sectional regions; and an internal tap contact is connected to the encircling structure at the third cross-sectional region.

8. The reflectron according to claim 7, wherein the area of the second cross-sectional region is less than the area of the first cross-sectional region and the area of the third cross-sectional region is less than the area of the first cross-sectional region.

9. The reflectron according to claim 8, wherein the encircling structure is funnel-shaped.

10. The reflectron according to claim 1, wherein the encircling structure is a hollow cylinder.

11. The reflectron according to claim 1, wherein the encircling structure has a polygonal cross-section.

12. The reflectron according to claim 1, further comprising a target region and wherein the encircling structure, the voltage supply, and the metallized contacts are adapted such that the reflected charged particles travel to the target region along a path which is at an angle to the path from the source.

13. The reflectron according to claim 1, wherein the resistive film is a bulk resistive material.

14. The reflectron according to claim 1, wherein the resistive film is selected from the group consisting of metal oxide film and polysilicon film.

15. The refractron according to claim 1, wherein the first voltage and the second voltage have a constant voltage difference between them.

16. A method for reflecting charged particles with the same polarity, the charged particles having one or more levels of kinetic energy, the method comprising, (A) propelling the charged particles along a path in a first direction;

(B) applying a continuous field gradient along a continuous encircling resistive film encircling a portion of the path in the first direction, the encircling resistive film having a first cross-sectional region and a second cross-sectional region such that the first cross-sectional region is nearer to a location from where the charged particles are propelled, the electric field at the second cross-sectional region being more repulsive to the charged particles than that at the first cross-sectional region such that the continuous electric field gradient continuously repels to decelerate the charged particles, change the direction of motion of the charged particles in a reflective fashion and thereafter accelerate the charged particles continuously to speed equal to the charged particles' respective speed before repulsion by the continuous field gradient, and such that charged particles in the first direction will turn from the first direction at different distances along the path dependent on their kinetic energy levels.

17. The method according to claim 16, wherein the reflected charged particles after acceleration have speed equal to the pre-deceleration speed of the charged particles.

18. The method according to claim 16, wherein the continuous voltage gradient is a result of applying a first voltage to the first cross-sectional region and applying a second voltage to the second cross-sectional region of the encircling resistive film, the encircling resistive film having a sheet resistance and a cross-section taken at any location between the first and the second cross-sectional regions has a symmetrical perimeter.

19. The method according to claim 16, further comprising providing a funnel-shaped encircling resistive film and applying a voltage differential across the encircling resistive film such that the electric field gradient provided is variable.

20. A reflectron for reflecting charged particles with the same polarity, the charged particles having one or more levels of kinetic energy and traveling from a source on a path, the reflectron comprising:

an encircling structure including a continuous resistive film which has a resistive internal surface encircling a portion of the path of the charged particles and has a sheet resistance, the encircling structure having a first cross-sectional region through which the charged particles from the source enter the encircling structure and a second cross-sectional region more distal to the source than the first, the resistive film having a shape such that a cross-section thereof at any location between the first and the second metallized contacts has a symmetrical perimeter surrounding a line of the path;

a first metallized contact, connected to the encircling structure at the first cross-sectional region;

a second metallized contact, connected to the encircling structure at the second cross-sectional region; and voltage supply for connecting electrically to the first metallized contact to apply thereto a first voltage and connecting to the second metallized contact to apply thereto a second voltage which is more repulsive to the charged particles than the first voltage to result in a continuous electric field gradient along the resistive film between the first cross-sectional region and the second cross-sectional region to continuously repel the charged particles to exit the encircling structure at the first cross-sectional region and such that the charged particles entering the encircling structure at their respective entering speed will penetrate the encircling structure to different distances dependent on their kinetic energy level before turning around and will exit the encircling structure with speed equal to their entering speed.

* * * * *